United States Patent
Raman et al.

(10) Patent No.: US 12,298,980 B1
(45) Date of Patent: May 13, 2025

(54) OPTIMIZED STORAGE OF METADATA SEPARATE FROM TIME SERIES DATA

(71) Applicant: Splunk Inc., San Francisco, CA (US)

(72) Inventors: Rajesh Raman, Palo Alto, CA (US);
Jennifer Williamson, Menlo Park, CA (US); Edward Crossman, Redwood City, CA (US); Uday Sagar Shiramshetty, Fremont, CA (US); Arijit Mukherji, Fremont, CA (US); Phillip Liu, Palo Alto, CA (US); Tianyu Wang, San Francisco, CA (US)

(73) Assignee: SPLUNK Inc., San Francisco, CA (US)

( * ) Notice: Subject to any disclaimer, the term of this patent is extended or adjusted under 35 U.S.C. 154(b) by 11 days.

(21) Appl. No.: 16/938,807

(22) Filed: Jul. 24, 2020

Related U.S. Application Data

(60) Provisional application No. 62/968,948, filed on Jan. 31, 2020.

(51) Int. Cl.
*G06F 16/2455* (2019.01)
*G06F 16/2457* (2019.01)
*G06F 16/248* (2019.01)

(52) U.S. Cl.
CPC .... *G06F 16/24568* (2019.01); *G06F 16/2456* (2019.01); *G06F 16/24573* (2019.01); *G06F 16/248* (2019.01)

(58) Field of Classification Search
CPC ......... G06F 16/24573; G06F 16/24568; G06F 16/2456
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 11,029,855 B1* | 6/2021 | Connolly | G06F 9/5011 |

(Continued)

OTHER PUBLICATIONS

Splunk Enterprise 8.0.0 Overview, available online, retrieved May 20, 2020 from docs.splunk.com.

(Continued)

*Primary Examiner* — Etienne P Leroux
*Assistant Examiner* — J Mitchell Curran
(74) *Attorney, Agent, or Firm* — Kilpatrick Townsend & Stockton LLP

(57) ABSTRACT

According to embodiments, a data stream including a plurality of time series data is received and metadata objects are extracted from the data stream. The metadata objects are associated with metrics time series (MTS) objects. The metadata objects and MTS objects are stored via separate in-memory data structures in a logical database. The in-memory data structures include information that correlates the metadata objects with the MTS objects. Any updates to the metadata objects will stay with the metadata objects and do not propagate to the MTS objects. A logical in-memory join may be performed to associate the metadata objects with the appropriate MTS object according to the in-memory data structures when a query for an MTS object is received.

28 Claims, 12 Drawing Sheets

(56) References Cited

U.S. PATENT DOCUMENTS

| | | | | |
|---|---|---|---|---|
| 2008/0313623 | A1* | 12/2008 | Waddington | G06F 16/2455 717/162 |
| 2014/0172866 | A1* | 6/2014 | Lin | G06F 16/2477 707/741 |
| 2015/0134797 | A1* | 5/2015 | Theimer | H04L 41/24 709/223 |
| 2016/0098388 | A1* | 4/2016 | Blevins | G06F 16/254 707/755 |
| 2017/0270147 | A1* | 9/2017 | Li | G06F 16/182 |
| 2018/0089188 | A1* | 3/2018 | Kharisma | G06F 16/24568 |
| 2019/0065573 | A1* | 2/2019 | Keller | G06F 16/2453 |
| 2019/0095516 | A1* | 3/2019 | Srinivasan | G06F 16/288 |
| 2019/0098106 | A1 | 3/2019 | Mungel et al. | |
| 2020/0174966 | A1* | 6/2020 | Szczepanik | G06F 16/116 |
| 2020/0285619 | A1* | 9/2020 | Teyer | G06F 16/2455 |
| 2021/0034586 | A1* | 2/2021 | Arye | G06F 16/215 |

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.
Carraso, David, "Exploring Splunk," published by CITO Research, New York, NY, Apr. 2012.

* cited by examiner

Figure 4:
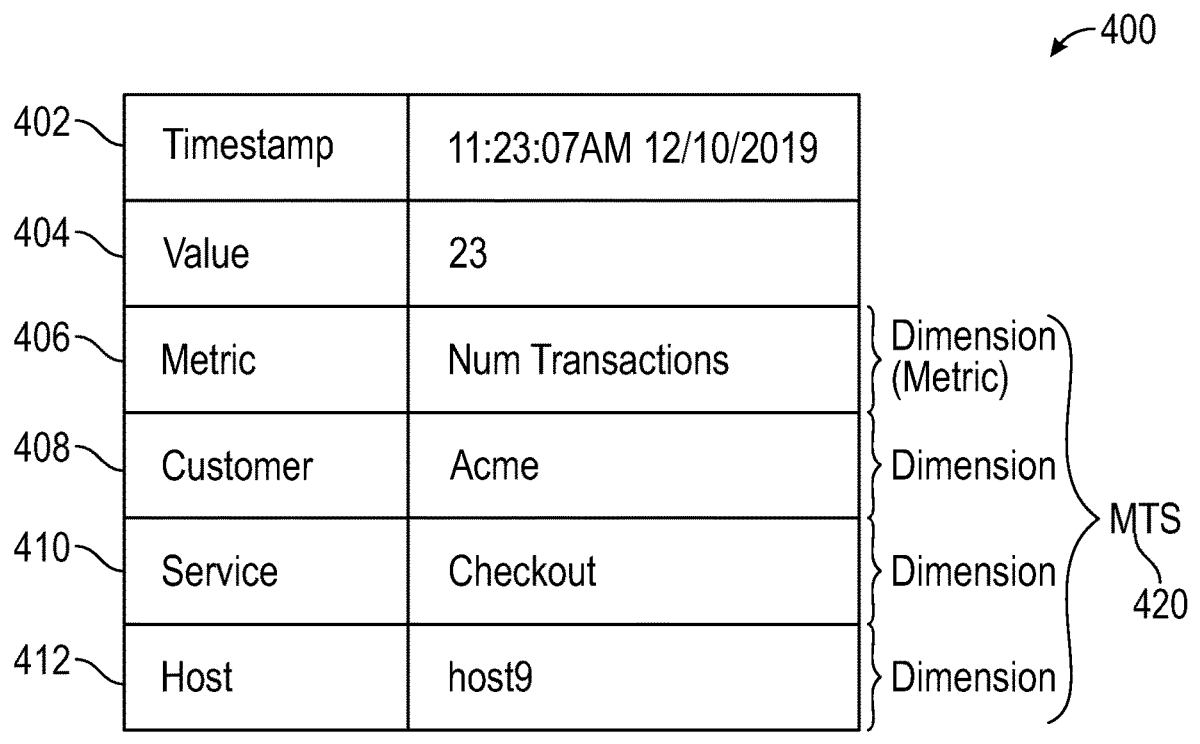

| | | |
|---|---|---|
| 402 — Timestamp | 11:23:07AM 12/10/2019 | |
| 404 — Value | 23 | |
| 406 — Metric | Num Transactions | Dimension (Metric) |
| 408 — Customer | Acme | Dimension |
| 410 — Service | Checkout | Dimension |
| 412 — Host | host9 | Dimension |

MTS 420

OPTIMIZED STORAGE OF METADATA SEPARATE FROM TIME SERIES DATA

CROSS REFERENCE TO RELATED APPLICATIONS

This present application claims the benefit of priority under 35 U.S.C. § 119 (e) to U.S. Provisional Application No. 62/968,948, filed Jan. 31, 2020, the disclosure of which is hereby incorporated by reference in its entirety for all purposes.

TECHNICAL FIELD

The present disclosure generally relates to storage of metadata, and more particularly to optimized storage of metadata separate from time series data.

BACKGROUND

Conventional techniques for processing metadata include associating a set of metadata objects (also called "dimensions") with a metric time series (MTS) object. Each dimension of the set of dimensions may also be associated with millions of other MTS objects. Because the MTS objects are de-normalized, that is, they include all the properties and all mutable and immutable information from all dimensions that link to the MTS object, an update to any single dimension also requires updates to every MTS object that links to that dimension. Oftentimes, this requires updating millions of MTS objects, which is resource intensive and causes delays.

BRIEF SUMMARY

Embodiments of the present disclosure provide for storing metadata in a distributed system. According to embodiments, a data stream including a plurality of time series data is received and metadata objects are extracted from the data stream. The metadata objects are associated with metrics time series (MTS) objects. The metadata objects and MTS objects are stored via separate in-memory data structures in a logical database. The in-memory data structures include information that correlates the metadata objects with the MTS objects. Any updates to the metadata objects will stay with the metadata objects and do not propagate to the MTS objects. A logical in-memory join may be performed to associate the metadata objects with the appropriate MTS object according to the in-memory data structures when a query for an MTS object is received.

According to embodiments of the present disclosure, a computer-implemented method for storing metadata in a distributed system is provided. The method includes receiving metadata from an input data stream, the metadata comprising information regarding data included in the input data stream. The method also includes associating the metadata with a metric time series (MTS) object, the MTS object comprising a plurality of metadata objects, wherein at least one metadata object of the plurality of metadata objects comprises a metric. The method also includes storing, in a first in-memory data structure of a logical database, the MTS object. The method also includes storing, in a second in-memory data structure of the logical database, the plurality of metadata objects, the second in-memory data structure different than the first in-memory data structure.

According to one embodiment of the present disclosure, a system for storing metadata in a distributed system is provided. The system may include at least one memory having instructions stored thereon. The system may also include at least one processor configured to execute the instructions, wherein the at least one processor is configured to receive metadata from an input data stream, the metadata comprising information regarding data included in the input data stream. The processor may further be configured to associate the metadata with a metric time series (MTS) object, the MTS object comprising a plurality of metadata objects, wherein at least one metadata object of the plurality of metadata objects comprises a metric. The processor may further be configured to store, in a first in-memory data structure of a logical database, the MTS object. The processor may further be configured to store, in a second in-memory data structure of the logical database, the plurality of metadata objects, the second in-memory data structure different than the first in-memory data structure.

According to one embodiment of the present disclosure, non-transitory computer-readable storage medium comprising instructions stored thereon, which when executed by one or more processors, cause the one or more processors to perform operations for storing metadata in a distributed system. The operations may include receiving metadata from an input data stream, the metadata comprising information regarding data included in the input data stream. The operations may also include associating the metadata with a metric time series (MTS) object, the MTS object comprising a plurality of metadata objects, wherein at least one metadata object of the plurality of metadata objects comprises a metric. The operations may also include storing, in a first in-memory data structure of a logical database, the MTS object. The operations may also include storing, in a second in-memory data structure of the logical database, the plurality of metadata objects, the second in-memory data structure different than the first in-memory data structure.

According to one embodiment of the present disclosure, a system is provided that includes means for storing instructions, and means for executing the stored instructions that, when executed by the means, causes the means to perform a method for storing metadata in a distributed system. The method includes receiving metadata from an input data stream, the metadata comprising information regarding data included in the input data stream. The method also includes associating the metadata with a metric time series (MTS) object, the MTS object comprising a plurality of metadata objects, wherein at least one metadata object of the plurality of metadata objects comprises a metric. The method also includes storing, in a first in-memory data structure of a logical database, the MTS object. The method also includes storing, in a second in-memory data structure of the logical database, the plurality of metadata objects, the second in-memory data structure different than the first in-memory data structure.

BRIEF DESCRIPTION OF THE DRAWINGS

The present disclosure is illustrated by way of example, and not limitation, in the figures of the accompanying drawings, in which like reference numerals indicate similar elements and in which:

FIG. 4 shows an example data structure, according to an embodiment of the present disclosure;

DETAILED DESCRIPTION

Figure 1:
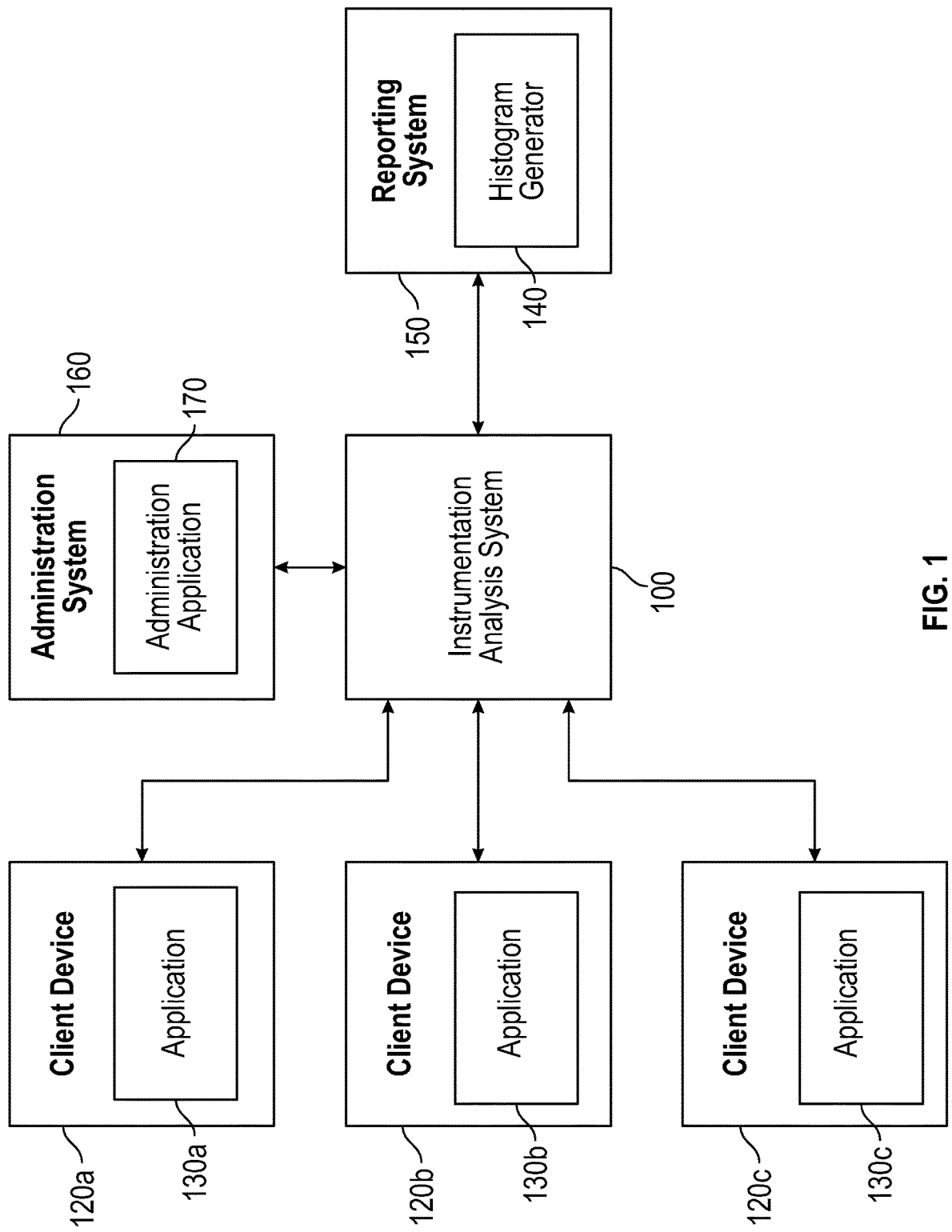
FIG. 1 shows an overall system environment for reporting based on instrumented software, according to an embodiment of the present disclosure.

Trace and Span Sampling and Analysis for Instrumented Software

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The term "trace" as used herein generally refers to a record of the manner in which a single user request, also referred to as a transaction, propagates from one microservice (hereinafter, interchangeably, referred to as "service") to the next in a distributed application. A transaction is generally described as an end-to-end request-response flow, from the making of the user's initial request to receiving the final response. A transaction often involves the interaction of multiple services. A trace is a record of a transaction and each trace may be identified using a unique trace identifier ("Trace ID"). The trace follows the course of a request or transaction from its source to its ultimate destination in a distributed system. A trace, in one embodiment, may be conceptualized as a highly dimensional structured log that captures the full graph of user-generated and background request execution within an application, and includes valuable information about interactions as well as causality.

The term "span" as used herein generally refers to the primary building block of a trace, representing an individual unit of work done in a distributed system. A trace is composed of one or more spans where a span represents a call within the request. It is appreciated that a call may be to a separate microservice or a function within a microservice. The trace represents the work done by each microservice which is captured as a collection of linked spans sharing the same unique Trace ID. Each component of the distributed system may contribute a span-a named, timed operation representing a piece of the workflow. A span may also include a unique span ID, a service name (e.g., "analytics"), an operation name (e.g., "start"), duration (latency), start and end timestamps and additional annotations and attributes (e.g., tags). The annotations and attributes can describe and contextualize the work being done under a span.

The term "tags" as used herein generally refers to key: value pairs that provide further context regarding the execution environment and enable user-defined annotation of spans in order to query, filter and comprehend trace data. Tag information is typically included with each span and there may be different levels of tag information included in a span. Tag information (including the 'key' and corresponding 'value') is typically included with each span and there may be different levels of tag information included in a span.

"Global tags" generally represent properties of a user-request (e.g. tenant name, tenant level, client location, environment type, etc.) and may be extracted from any span of the trace based on configured rules. A global tag for a particular span in a trace may be attributed to the other spans in a trace, because each span within a single trace may comprise the same global attributes. For example, if one span within a trace comprises a tag relating it to a request from a "gold" level "tenant," it may be inferred that other spans in the same trace are associated with the same request and, accordingly, from the same "gold" level "tenant." Consequently, the "tenant: gold" key-value pair or tag may be attributed to the other spans in the same trace.

"Service-level tags" generally represent a non-global property of the service or the infrastructure that the associated span (which served a portion of the request) executed on, e.g., service version, host name, region, etc. Spans that executed on different services may have different values for the same tag, e.g. tag "region" may take different values in two services: a span in Service A may be attributed to "region: east" and a span in Service B attributed to "region: west". Also, multiple instances of the same service can serve different parts of the request and so the same service may be associated with different service-level tags in relation to those different parts.

"Span-level tags" comprise attributes that are specific to a particular span.

The term "root span" as used herein generally refers to the first span in a trace. A span without a parent is called a root span.

The term "child span" as used herein generally refers to a span that follows a root span, including a child of a child.

The term "parent span" as used herein generally refers to a span that executes a call (to a different service or a function within the same service) that generates another span, wherein the span executing the call is the "parent span" and the span generated in response to the call is the "child span." Each span may typically comprise information identifying its parent span, which along with the Trace ID, may be used to consolidate spans associated with the same user-request into a trace.

A "metric" as used herein generally refers to a single quantifiable measurement at a specific point in time. Combining the measurement with a timestamp and one or more metadata objects (also referred to herein as "dimensions") results in a metric data point. A single metric data point may include multiple measurements and multiple dimensions. Metrics are used to track and assess the status of one or more processes. A metric typically comprises a numeric value that is stored as a timeseries.

Software developers monitor different aspects of software they develop by instrumenting the software. These aspects include performance of the software, disk utilization of the software, CPU utilization of the software, errors encountered during execution of the software, significant events encountered during execution of the software, information describing which parts of the code are being executed and which parts are not being executed, and so on. After development, similar aspects of the software are also monitored during production, for example, when software is being executed on a cloud architecture.

Conventional user environments are complicated because they include many micro transactions that are handled by a variety of hosts, containers, and infrastructure platforms. As a result, it is difficult to identify a root cause of an alert for a network problem, bad process, poor service, etc.

Computing operations can be described by spans and traces. A span may include an atomic computing operation performed in handling a request, and may include an operation name (e.g., "start"), a service (e.g., "analytics"), and start and end timestamps. Spans may be annotated with additional tags, such as key: value pairs, that provide further context regarding the execution environment. For example, a trace may include a set of spans traversed in the handing of a single request.

According to embodiments, each span and trace may have a duration equal to the difference between the start and end timestamps for the span, or for the group of spans forming the trace. Instrumented software may be instrumented to emit spans and traces. The spans and traces can be generated according to an industry standard, such as the OpenTracing standard. Each span may be annotated with one or more tags that provide context about the execution, such as the user instrumenting the software, a document involved in the request, an infrastructure element used in servicing a request, etc.

Communicating all of the spans and traces produced by a software application to an analysis system and storing these spans and traces imposes a serious infrastructure cost. Furthermore, it is unnecessary to transfer and store all emitted spans and traces, since code usually executes quickly and without errors. In prior implementations, traces emitted by a software application were randomly sampled and transmitted for analysis. However, certain types of traces provide more valuable information, and random sampling may not surface these traces. For example, if most traces are error-free, and only a few indicate errors, a random sampling scheme provides a large amount of uninteresting, error-free traces, and may miss the traces that indicate errors.

To obtain a sample of traces that includes a higher proportion of interesting traces, a gateway performs tail-based sampling of traces. The gateway resides at the instrumented software, receives all emitted spans and traces, and in real or near-real time, selects traces to transmit to an analysis system. For example, the gateway selects a portion of traces that include an interesting span (e.g., selecting for spans with long durations), a portion of traces that include a span with an error, and a portion of traces selected based on overall trace duration. The gateway may select spans and traces using a statistical model that references a reservoir of spans and traces. The gateway maintains in the reservoir a collection of duration values that describe the distributions of durations for recently received traces and recently received spans, and the span or trace distribution is used to calculate a score for each received span or trace. Each emitted trace has a chance of being selected, but the gateway favors selecting longer or unusual spans and traces. Each selected trace is associated with a weight indicating the likelihood that the trace is stored according to the statistical model.

The gateway may use a dynamic timeout mechanism to determine when a trace is complete. For example, the dynamic timeout mechanism may include both a fixed duration (e.g., 100 ms) and a variable duration that is calculated based on durations of other traces. If a trace reaches the larger of the fixed duration and the variable duration, it is considered complete and passed through the sampling mechanism in the gateway. The reservoir of recently received traces may be used to calculate the variable duration; for example, the variable duration may be five times the 99th percentile duration for a trace or a curve based on duration. Both the fixed duration and the variable duration may be configurable. The dynamic timeout mechanism provides a balance between completeness/accuracy and timeliness. In addition, the dynamic timeout mechanism saves memory compared to using only a longer fixed duration, since in most cases, the sampling decision can be made sooner than if only a long fixed duration (e.g., 5 minutes) is used.

The analysis system receives the traces selected by the gateway and performs analysis on the selected traces. The analysis system may derive a distribution of all of the emitted spans and traces (not just the selected traces) based on the weights. The analysis system may receive traces, with their component spans and associated tags, from multiple instances of instrumented software.

In an embodiment, the analysis system compares durations of a set of similar spans (e.g., spans for the same type of request) with the tags associated with these spans and determines whether there are any patterns for a given tag. The analysis system generates a histogram that represents a distribution of durations for a set of spans. For a given tag, the analysis system calculates a p-value indicating the likelihood that the ranks of the spans for that tag in the distribution arose by chance. In particular, the analysis system may calculate a p-value of the Mann-Whitney U-statistic comparing the ranks of the durations of the traces having the tag to the other traces in the distribution. A larger U-statistic indicates that the spans for that tag skew rightward, i.e., that they tend to have long durations relative to other spans in the distribution. The analysis system can provide alerts regarding the tags whose spans have relatively long duration. Long duration spans may be indicative of configuration problems at the instrumented systems. The analysis system may correct the p-value for the number of hypotheses tested, for example by multiplying the p-value by the total number of tags. This procedure defines a map from tags to non-negative real numbers. The analysis system sorts the tags by the associated p-value (e.g., in ascending order) and returns those with p-values less than or equal to some threshold, e.g., 0.01.

In another embodiment, the analysis system uncovers patterns relating span tags to error spans, which are spans that cause an error or exception to be thrown. This can highlight possible explanations for errors and help users understand patterns among errors. For example, the analysis system can determine if error spans tend to come from a particular user (whose requests might be somehow malformed). To analyze errors, the analysis system computes, for each tag, the chi-squared statistic for the null hypothesis that the presence of the tag is statistically independent of whether the span is an error. The statistic will be larger (and the associated p-value smaller) when the tag is significantly more common among error spans than it is among non-error spans. The analysis system may correct the p-value for the number of hypotheses tested, for example by multiplying the p-value by the total number of tags. This procedure defines a map from tags to non-negative real numbers. The analysis system sorts the tags by the associated p-value (in ascending order) and returns those with p-values less than or equal to some threshold, e.g., 0.01.

Architecture of a Metadata System in a Metrics Engine

FIG. 1 shows the overall system environment for reporting based on instrumented software, according to an embodiment. The overall system environment includes an instrumentation analysis system 100, one or more client devices 120, an administration system 160, and a reporting system 150. In other embodiments, more or less components than those indicated in FIG. 1 may be used. For example, client devices 120, administration system 160, and reporting system 150 may interact with instrumentation analysis system 100 via a network (not shown in FIG. 1). Furthermore, there may be more or less instances of each system shown in FIG. 1; for example, there may be multiple reporting systems 150.

FIG. 1 and the other figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral (e.g., "130" in the text refers to reference numerals "130a" and/or "130b" in the figures).

The instrumentation analysis system 100 receives data comprising values of metrics sent by different client devices 120 (e.g., the instrumentation analysis system 100 may also be referred to herein as an analysis system or a data analysis system). A client device 120 executes instrumented software, for example, application 130. Although, application 130 is shown in FIG. 1 as an example of instrumented software, the techniques disclosed herein are not limited to application software but are applicable to other kinds of software, for example, server software, software executing on customer devices, websites, and so on. Furthermore, a client device 120 may include any computing system that is configured to execute instrumented software, whether or not it is used for development of improved software. For example, the client device 120 may be a computing system used for testing purposes, staging purposes, or any production system executing in an enterprise.

The software executing on a client device 120 is configured to send information generated as a result of instrumenting the software to instrumentation analysis system 100. For example, the application 130 may send values corresponding to various metrics as they are generated to instrumentation analysis system 100. The application 130 may send group values of metrics and send them periodically to instrumentation analysis system 100. Different applications 130 may send the same metric or different metrics at different rates. The same application may send different metrics at different rates. In an implementation, the application 130 may send data to the instrumentation analysis system 100 by invoking an application programming interface (API) supported by the instrumentation analysis system 100.

A gauge comprises instructions to measure certain runtime characteristics of the application 130, for example, heap size, number of cache misses or hits, active memory used, central processing unit (CPU) utilization, total time taken to respond to a request, time taken to connect to a service, and so on. A gauge may also be used to track certain application-specific parameters or business related values, for example, number of transactions, number of users, and so on. The gauge may be invoked periodically based on an interval that is configurable. The value of the gauge is sent to instrumentation analysis system 100 periodically.

A software program may be instrumented to generate spans with a common field in their data structures to designate spans that are part of a common trace. For example, the spans may include a trace identifier such that spans with the same trace identifier are a part of the same trace. A length of each trace may be determined by an administrator through the administration system 160.

The administration system 160 allows a privileged user, for example, a system administrator, to associate data streams with metadata. The administration system 160 comprises the administration application 170 that provides a user interface for a system administrator to specify the metadata. The metadata comprises properties, for example, name-value pairs. The instrumentation analysis system 100 receives metadata describing data streams and stores the metadata. The ability to specify metadata describing data streams independently from the data received from each data stream provides several benefits in generating reports based on the data stream.

As an example, the instrumentation analysis system 100 can receive modifications to metadata describing each data stream without requiring any modifications to the instrumented software of the application 130. As a result, the instrumentation analysis system 100 receives specifications of new reports and modifications to existing reports and generates results based on the new/modified reports without requiring the developers to modify the application 130.

Furthermore, the instrumentation analysis system 100 can also receive and process reports built on top of existing reports by composing existing reports and adding new analytics functionality. The instrumentation analysis system 100 generates results of the new reports and sends them for presentation in real-time as the instrumentation analysis system 100 receives data streams from instrumented software. The instrumentation analysis system 100 generates these additional reports and modifies existing reports without requiring any modifications to the instrumented code of the application 130.

Furthermore, the instrumentation analysis system 100 provides separation of the metadata describing the data streams from the data of the data streams. Accordingly, the amount of data that needs to be transmitted from the client devices 120 to the instrumentation analysis system 100 is reduced. Each application 130 transmits only the data values of the metrics and information identifying the metric. The metadata information is received separately from a source independent of the data source of the data streams. Accordingly, any amount of metadata may be introduced without increasing the amount of data of each data stream.

The reporting system 150 may be configured to generate a histogram to analyze generated spans and traces. In an implementation, the reporting system 150 may include a histogram generator 140 that interacts with the instrumentation analysis system 100 to generate a histogram.

The reporting system 150 can be a conventional computer system (e.g., a desktop or laptop computer), a tablet, or a device having computer functionality such as a personal digital assistant (PDA), a mobile telephone, a smart phone, or another suitable device. The reporting system 150 interacts with instrumentation analysis system 100 via a network. The network may comprise any combination of local area and/or wide area networks, using both wired and/or wireless communication systems. In one embodiment, the network uses standard communications technologies and/or protocols.

The instrumentation analysis system 100 may be hosted on a computing system that includes one or more processors, memory, secondary storage, and input/output controller. The computing system used for hosting the instrumentation analysis system 100 is typically a server-class system that uses powerful processors, large memory, and fast input/output systems compared to a typical computing system used, for example, as a reporting system 150.

In an embodiment, data from several client devices 120 may be consolidated, for example, by a server and the combined data sent to the instrumentation analysis system 100. For example, an enterprise may install a server that receives data streams internally from different client devices 120 and sends the combined data in a batch form to the instrumentation analysis system 100 periodically. This allows efficiency of external communication from the enterprise.

A data stream may be identified by using a set of coordinates representing values of dimensions associated with data streams. A dimension refers to a property of data streams that can take one of a set of values. Each data stream may be associated with a value for a dimension. For example, a dimension can be a source of a data stream or a metric name associated with a data stream. A source of a data stream may be identified by a server name, a service name, and so on. Examples of metric names are CPU load, cache misses, cache hits, and so on. A value of a dimension is also referred to as a coordinate value of the data stream. A coordinate value may be represented as a metadata attribute stored in a metadata store. Given the two dimensions of source and metric, a data stream may be identified by providing the two coordinates representing the source and the metric, for example, (server1, cpu_load) or (server2, memory_usage).

A data stream may be characterized by multiple dimensions more than the two dimensions (i.e., source and metric name) described above. For example, if each server has multiple CPUs, a dimension cpu_id may be included. Accordingly, each data stream obtained from a system may be characterized by (source_id, cpu_id, metric_name), i.e., a source identifier, a CPU identifier, and a name for the metric. Examples of data streams identified using three coordinates include (server1, cpu1, load), (server1, cpu2, load), (server2, cpu1, load), (server2, cpu2, load), and so on. According to embodiments, each data stream may include spans and traces.

As another example of a dimension, a system may define customer name as a dimension. The name of the customer may be reported by the instrumented software, for example, based on the configuration parameters of the instrumented software executing on a client device 120. The customer name may be specified for the instrumented software using a system property. The instrumented software includes the customer name when it identifies a data stream associated with that particular customer. The ability to associate a data stream with a customer allows the instrumentation analysis system to perform customer-specific analysis, for example, report on usages of systems for each customer, identify customers reporting more than a threshold number of errors, and so on.

A data stream may be obtained from instrumented software or may be generated as a result of execution of blocks of a data stream language program within the instrumentation analysis system 100. A data stream may also comprise data stored in the instrumentation analysis system 100, for example, in a data store, such as a time series data store 260, described herein.

Figure 2:
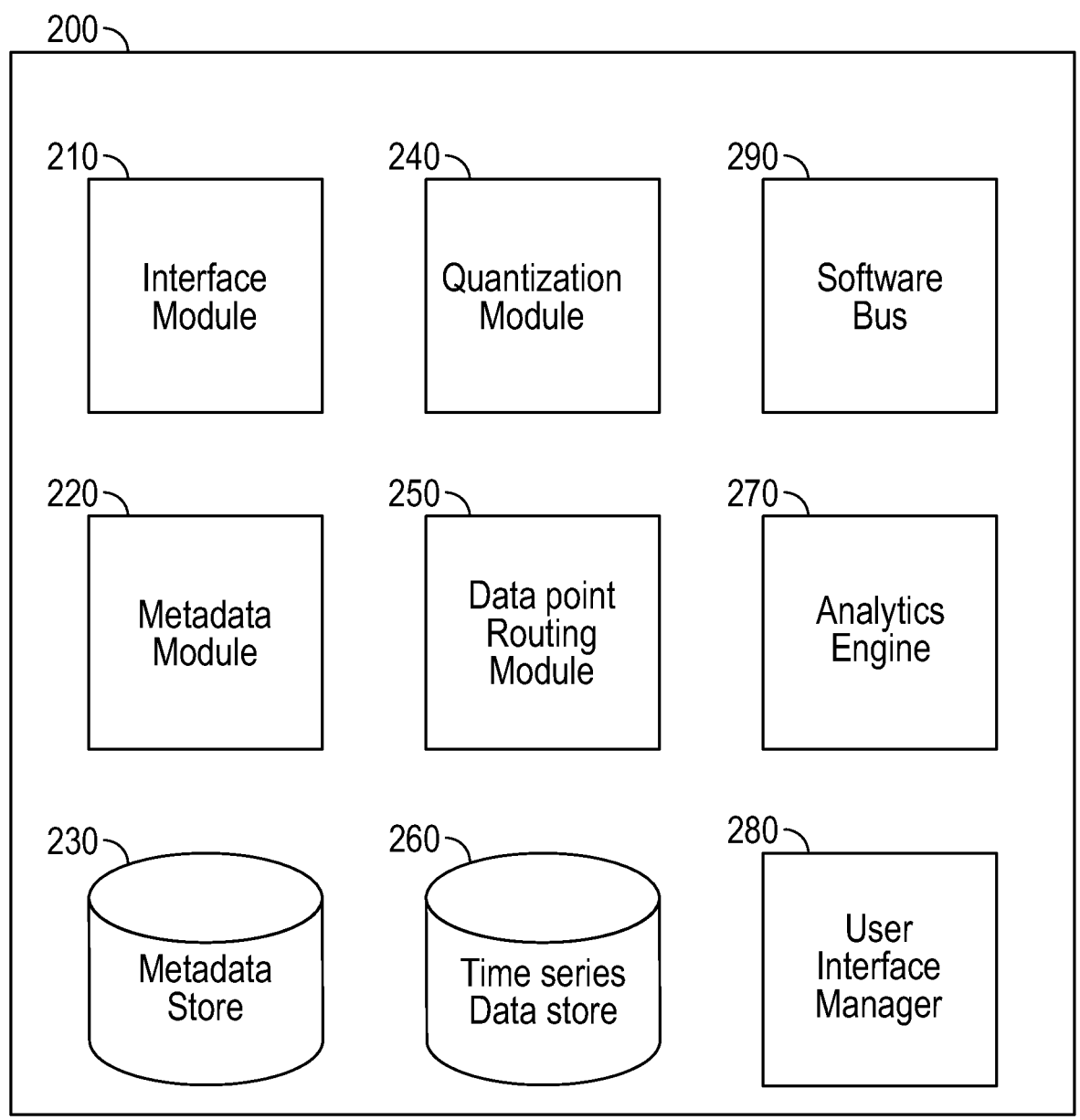
FIG. 2 shows an architecture of a system for processing data streams received from instrumented software, according to an embodiment of the present disclosure.

FIG. 2 shows an architecture of a system for processing data streams received from instrumented software, according to an embodiment. The instrumentation analysis system 200 includes an interface module 210, a quantization module 240, metadata module 220, metadata store 230, a data point routing module 250, an analytics engine 270, a user interface manager 280, a time series data store 260, and a software bus 290. In other embodiments, the instrumentation analysis system 200 may include other modules not described herein. Functionality indicated as provided by a particular module may be implemented by other modules instead.

The interface module 210 receives requests from external systems, for example, client devices 120 that communicate with the instrumentation analysis system 200. The interface module 210 supports various application programming interfaces (APIs) that external systems can invoke. The interface module 210 can receive and process data provided by applications 130 that are instrumented using functionality provided by different vendors, so long as the instrumented code sends the information in a format that can be processed by the interface module 210.

The interface module 210 receives data in the form of data streams comprising spans and traces from one or more client devices 120. In an embodiment, the interface module 210 receives data and represents the incoming data as tuples. Accordingly, each data stream is represented as a plurality of tuples, each tuple representing a data point. A tuple of data received by the interface module 210 comprises various elements. A tuple of data includes a metric identifier, for example, a name of the metric corresponding to the tuple and a value of the metric. The tuple of data received may further comprise other elements, for example, a timestamp corresponding to the time that the data was captured by the application 130 sending the data, and one or more properties associated with the data.

In an embodiment, the timestamp associated with a tuple represents the time that the data value was received by the instrumentation analysis system 200. The properties associated with the data may be provided in the form of name-value pairs. These properties may provide additional information describing the data received, for example, information describing the source of the data such as a host name, server name, device name, or service name associated with the source, a method or function name associated with the data, an application instance identifier, and so on.

In an embodiment, the interface module 210 generates and assigns an identifier to records received by the interface module 210. The identifier is referred to herein as a time series identifier (also referred to herein as a TSID or tsid). A unique time series identifier is assigned to all tuples matching a metric name and a set of properties received with the tuple. Accordingly, a tuple (metric name, properties, metric value, timestamp) gets mapped to a tuple (tsid, metric value, timestamp). For example, if a tuple provides a metric name m1, and a hostname h1, all tuples with metric name m1 and hostname h1 are assigned the same time series identifier. Accordingly, the tsid uniquely identifies all tuples of a data stream received by the instrumentation analysis system 200.

The metadata module 220 receives and stores metadata information describing various data streams received from the client devices 120. In an embodiment, the metadata stored in the metadata module 220 is received from a user, for example, a system administrator interacting with the instrumentation analysis system 200 using the administration system 160.

The metadata may be represented as name-value pairs. In an embodiment, the metadata is represented as metadata objects, each object defining a set of properties that may be represented as name-value pairs. A set of data streams may be associated with the metadata object. Accordingly, all properties represented by the metadata object are associated with each data stream that is associated with the metadata object.

The metadata store 230 stores the metadata objects and their associations with the data streams. The metadata store 230 stores an identifier (ID) for each metadata object and the properties represented by the metadata object. In an embodiment, each data stream is associated with a time series identifier that uniquely identifies the data stream. The metadata store 230 stores an index that maps each metadata object to a set of time series identifier values. The metadata store 230 may receive instructions to modify a metadata object. For example, the metadata store 230 may receive instructions to modify, add, or delete some properties represented by a metadata object. Alternatively, the metadata store 230 may receive instructions to modify the mapping from a metadata object to a data stream. For example, the metadata store 230 may receive instructions to associate a data stream with a metadata object or delete an association between a metadata object and a data stream.

In an embodiment, the metadata store 230 is represented as a relational database but may be represented as any other type of database or data store. For example, the metadata store 230 may be a relational database storing tables that map metadata object IDs to time series IDs identifying data streams. Other database tables may store the properties associated with each metadata object as a mapping from metadata object ID to each property represented as a name-value pair.

The time series data store 260 stores data received from various sources, for example, client devices 120. The time series data store 260 is also referred to herein as a time series database (or TSDB). In an embodiment, the time series data store 260 also stores the time series data after the data is quantized. The time series data store 260 may also store rollup data for each time series. The time series data store 260 also stores results of various analytics requests, for example, results of various reports requested by a user. The analytics engine 270 computes results for certain reports, for example, moving averages over intervals of time by combining data stored in the time series data store 260 with new data obtained as data stream from various sources.

The software bus 290 provides a mechanism for modules of the instrumentation analysis system 200 to provide data of data streams to other modules of the instrumentation analysis system 200. A data stream language program may send a data stream to the software bus 290. Other modules, for example, fetch modules, window modules, and so on, can read the data from the software bus 290 and perform further processing on the data. For example, a data stream output of a data stream language program published on the software bus 290 may be identified by a find block of another data stream language program executing as a job.

Architecture for Processing Input Data

Figure 3:
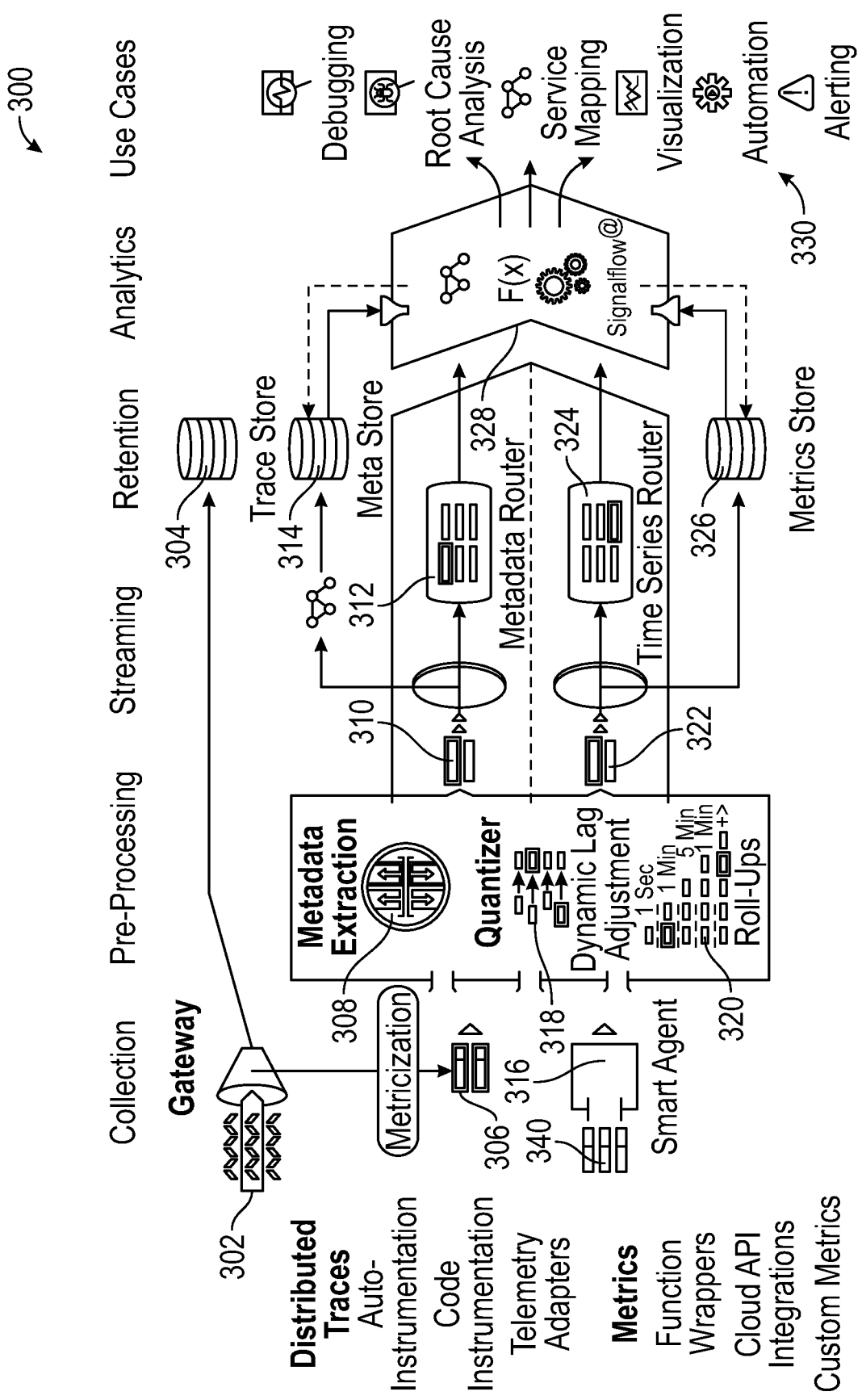
FIG. 3 shows an overall system architecture for processing input data, according to an embodiment of the present disclosure.

FIG. 3 shows an overall system architecture 300 for processing input data, according to an embodiment of the present disclosure. The architecture 300 may be configured to receive an input data stream 302. The input data stream 302 may include tail-sampled traces that are stored in a trace database 304. The input data stream 302 may also be metricized to generate metricized data 306. Metadata 310 may be extracted from the metricized data 306 through a metadata extractor 308.

According to embodiments, input data 340 may be processed by a smart agent 316 and quantized into metrics 322 to adjust for lag 318 based on roll-up periods 320. For example, the input data 340 may be received from cloud services (e.g., AMAZON WEB SERVICES, AZURE, GOOGLE CLOUD, etc.), open source software, language libraries (e.g., JAVA, PYTHON, GOLANG, etc.), operating systems, etc. In an implementation, the input data 340 may be processed based on a series of time windows (e.g., 1 sec, 1 min, 5 min, 1 hour, etc.). Multiple roll-ups including sum, count, min, max, lag, etc. may also be calculated.

According to embodiments, the metadata 310 may be processed separately from the metrics 322. For example, the metadata 310 may be stored in a metadata database 314 and also processed through a metadata router 312. The metrics 322 may be stored in a metric database 326 and processed through a time series router 324. The metadata 310 and metrics 322 may further be processed through a signal flow 328 as inputs to data science processes 330. For example, the data science processes 330 may include automatic outlier analysis, trace analysis, and incident analysis, among others.

FIG. 4 shows an example data structure 400, according to an embodiment of the present disclosure. For example, the data structure 400 may include a timestamp 402, a value 404, and a metric time series (MTS) object 420. The MTS object 420 may include multiple dimensions (e.g., metadata objects), such as a metric 406, a customer 408, a service 410, and a host 412. In implementations, the metric 406 may be a special case of a dimension. It is understood that an MTS object 420 may include at least one dimension, and as many as over 30 dimensions.

According to embodiments, the MTS object 420 may be identified by a unique combination of dimensions. For example, the illustrated MTS object 420 has four dimensions-one dimension each for a metric 406, a customer 408, a service 410, and a host 412. If dimensions were added, removed, or changed, the MTS object 420 would be recognized as a different MTS object from before.

According to embodiments, names and values may be extracted from the metadata. For example, the names may include tags such as "customer," "service," "host," etc. The values may include corresponding properties of the tags (e.g., keys), such as "num_transactions," "customer_name," "service_name," host_name," etc. The names may be linked with the values as name-value pairs, such that each dimension of an MTS object includes a name-value pair. For example, as illustrated in FIG. 4, "Customer-Acme," "Metric-Num_Transactions," "Service-Checkout," and "Host-host9" may be name-value pairs for each dimension of the MTS object 420. In this way, each MTS object 420 can point to multiple dimensions.

Figure 5:
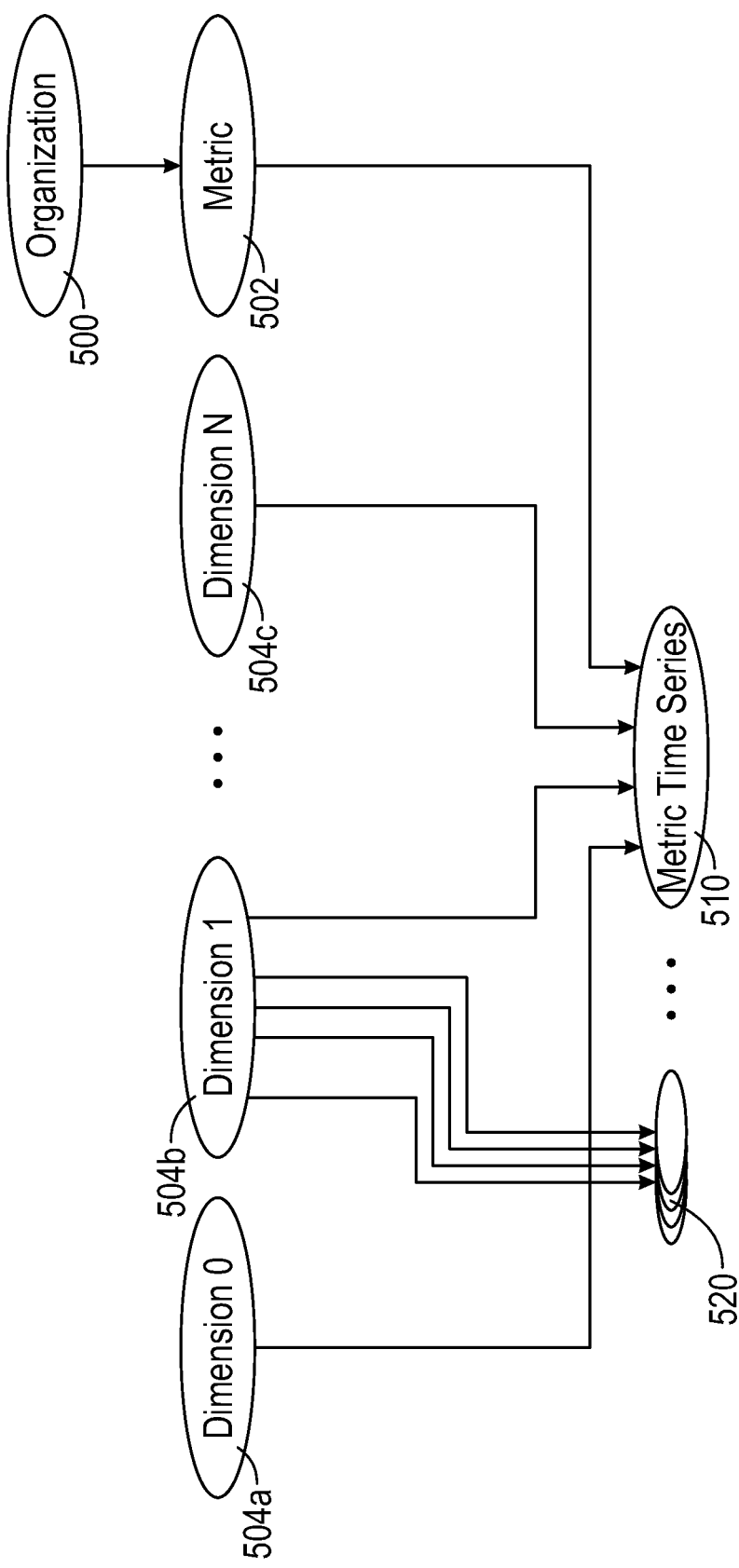
FIG. 5 shows an example of a conventional metric time series (MTS) object, according to an embodiment of the present disclosure.

FIG. 5 shows an example of a conventional metric time series (MTS) object 510. As illustrated, the MTS object 510 is de-normalized, which means that the MTS object 510 inherits all of the properties of dimensions 504a, 504b, 504c, metric 502, and organization 500. For example, the dimensions 504 may be for host, cluster, service, etc. The metric 502 is a special dimension with a fixed, well-known name. Each dimension 504 may have an immutable name and value, and a unique name-value combination (e.g., in the namespace of the tenant). Each dimension 504 may also optionally store additional mutable properties.

Conventionally, any change(s) to any of the properties of the dimensions 504a, 504b, 504c, metric 502, and/or organization 500 would be copied down to the MTS object 510. Conventionally, the dimensions 504a, 504b, and 504c may also be linked to millions of other MTS objects 520. As a result, any change(s) to any of the properties of any of the dimensions 504a, 504b, 504c, metric 502, and/or organization 500 would also be copied down to the millions of other MTS objects 520 as well. This is problematic because it is resource intensive and causes undesirable delays to the architecture 300.

Bifurcated Storage of Metadata

As described above, conventional techniques for processing metadata include associating a set of metadata objects (dimensions) with a metric time series (MTS) object. Each dimension of the set of dimensions may also be associated with millions of other MTS objects. Because the MTS objects are de-normalized, that is, they include all the properties and all mutable and immutable information from all dimensions that link to the MTS object, an update to any single dimension also requires updates to every MTS object that link to that dimension. Oftentimes, this requires updating millions of MTS objects, which is resource intensive and causes delays.

Conventionally, MTS objects may be searched using (combinations of) names and values of any dimensions or properties that are associated with it. As a result, storage grows rapidly and is very intensively used, which results in high operation costs in terms of cloud provider costs and administrator resources involved to keep the searches running. For example, a truth database and an index-based search engine store the same data. The truth database is used as a primary transactional store (i.e., "source of truth") to generate/lookup object keys, and store data. The index-based search engine is used to fulfill search queries, such as find the most recent 10,000 MTS objects that match certain conditions. As described above, all dimensions and property data are propagated (i.e., copied) to denormalized MTS objects to enable easy searching.

The largest impact on operational cost and stability of the whole system is the index-based search engine indices of MTS objects. For example, indexing of the incoming data is asynchronous and somewhat unpredictable, and index size grows rapidly (1 billion new MTS objects per month), which means the index-based search engine cluster grows as well. Because the index-based search engine represents MTS objects in denormalized form, the index quickly becomes excessively large. As a result, expensive queries may overload clusters. Furthermore, deleting ephemeral MTS objects from the index-based search engine is not efficient. Finally, the conventional propagation-based model updates every MTS object when a dimension property is added or removed, which becomes unsustainable with a large number of MTS objects, as described above.

According to an embodiment, in-memory data structures (such as tables) are generated in a logical database that stores dimensions and MTS objects separately. Those skilled in the art will appreciate that other types of data structures may also be used instead of or in addition to tables without departing from the scope of the present disclosure. The in-memory tables include information that correlates the dimensions with the MTS objects. Because the dimensions are stored separately from the MTS objects, any updates to the dimensions stay with the dimensions and do not propagate to the MTS objects. A logical in-memory join query may be utilized to associate the dimensions with the appropriate MTS object according to the in-memory tables. For example, upon receiving a query for an MTS object, a logical in-memory join may be performed to identify and retrieve all of the dimensions associated with the MTS object.

According to embodiments, dimensions and MTS objects are stored in normalized form, with queries using in-memory joins. Storing data in normalized form removes the problems imposed by propagation. According to embodiments, all data are stored in compact in-memory tables that have custom cache-friendly layouts that are specific to the known structure of the metadata model.

The disclosed system addresses a problem in traditional metadata processing and storage tied to computer technology, namely, the technical problem of reducing infrastructure metadata storage cost. The disclosed system solves this technical problem by providing a solution also rooted in computer technology, namely, by providing for optimized bifurcation of metadata storage. The disclosed subject technology further provides improvements to the functioning of the computer itself because it reduces the cost of data storage on the infrastructure and improves efficiency in searching the metadata.

Further advantages of the described memory data structures include the ability to handle large shocks of MTS object generations or modifications efficiently. Additionally, because the metadata system is replicated and clustered in a distributed system, it allows for high scalability, fault tolerance, and availability relative to traditional databases (e.g., relational database management systems (RDBMSs)). Furthermore, encoding and layout of data via in-memory tables are custom and specific to the problem of managing MTS objects, as opposed to a general-purpose database system.

Figure 6:
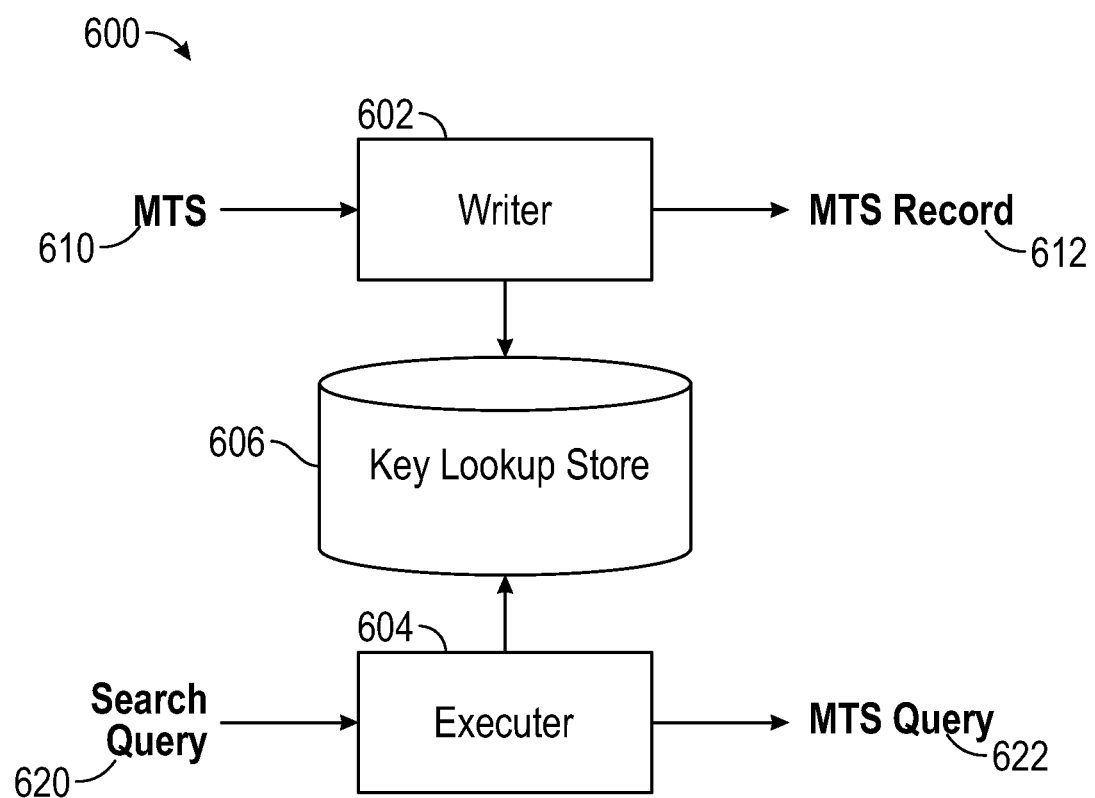
FIG. 6 illustrates exemplary architecture for bifurcating storage of metadata, according to an embodiment of the present disclosure.

FIG. 6 illustrates an exemplary architecture 600 for bifurcating storage of metadata, according to an embodiment of the present disclosure. For example, the architecture 600 may include a writer 602 and an executor 604 coupled to a key lookup store 606 (e.g., a storage system). According to embodiments, an MTS object 610 may be processed by the writer 602 to generate an MTS record 612. For example, the writer 602 may look up key-value pairs in the key lookup store 606 to combine names with values for storage as the MTS record 612. As such, the MTS record 612 may be searched by utilizing combined values of names and values of the MTS objects 610.

According to embodiments, the key lookup store 606 may be configured to store multiple in-memory tables. For example, each in-memory table may be configured to store name maps, value maps, name table, value tables, and/or dimension maps. The in-memory tables may include information regarding MTS objects, dimension properties, dimensions, etc. As the MTS objects 610 are input into the writer 602, the writer 602 updates the appropriate in-memory tables accordingly.

Similarly, a search query 620 may be received by the executor 604 to generate an MTS query 622. For example, as the search queries 620 are input into the executor 604, the executor 604 may look up key-value pairs in the in-memory tables of the key lookup store 606 to execute the search queries 620. The executor 604 may also be configured to perform in-memory joins based on information in the in-memory tables to generate the MTS query 622. According to embodiments, the in-memory joins may include relational joins, which processes relationships between different types of data by referring to an association(s) between the two different types of data. According to embodiments, the in-memory joins may be applied to process relationships between dimensions and MTS objects 610.

According to embodiments, a set of queries regarding the MTS objects may be stored such that updates to the MTS objects may be automatically provided to a user without additional querying.

Figure 7:
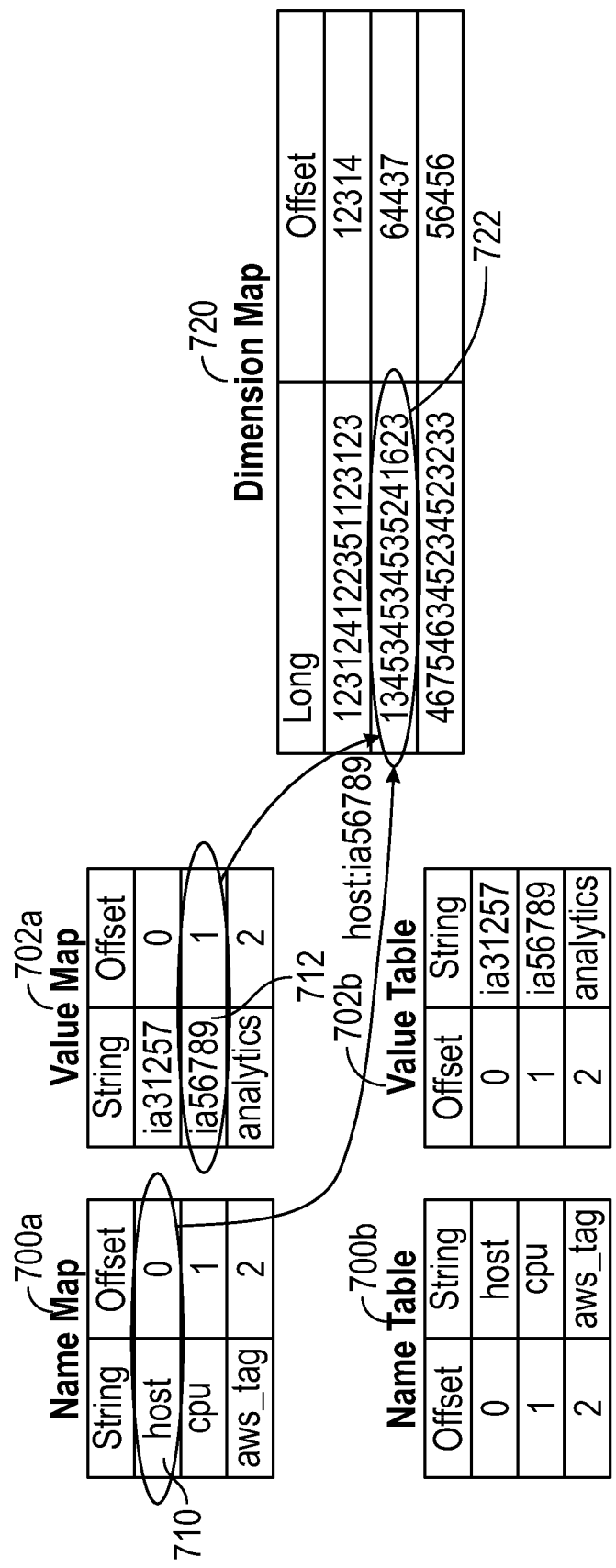
FIG. 7 illustrates example MTS indexes, according to an embodiment of the present disclosure.

FIG. 7 illustrates example MTS indexes, according to an embodiment of the present disclosure. For example, the MTS indexes may include a name map 700, a value map 702, a name table 704, a value table 706, and a dimension map 720. For example, the name table 700b may be a reverse-index of the name map 700a, and the value table 702b may be a reverse-index of the value map 702a. The name map 700 may be an in-memory table that maps name string values to name offset values. For example, a name "host" 710 may have an offset of "0." The value map 702 may be an in-memory table that maps string values to offset values. For example, a string "ia56789" 712 may have an offset of "1." Similarly, the name table 704 and the value table 706 may include associations of name and value strings with their corresponding offsets.

According to embodiments, the name map 700a provides associations between strings and numbers. For example, a first number entry may be "0," followed by "1," "2," "3," and so on. The names may be entered to correspond to each number entry. As illustrated, "host" 710 is associated with "0," "cpu" is next and is associated with "1," and after that is "aws_tag" associated with "2." In an implementation, the names of the name map 700a may be dimension names. The value map 702a may be populated similarly to the name map 700a. Additionally the name table 700b and the value table 702b may be populated afterwards as reverse-indexes of the name map 700a and the value map 702a, respectively.

According to embodiments, the value map 702a includes specific details of each of the names of the name map 700a. For example, a host may have specific names, which may correlate to further details of the host, such as location, specifications, history, etc. In an implementation, each string name in the name map 700a may correlate to multiple strings in the value map 702a. For example, the string "host" 710 may be associated with each string in the value map 702a. Similarly, each string (e.g., name) in the name map 700a may have its own value map 702a with multiple corresponding value strings and offsets.

According to embodiments, the dimension map 720 includes long values corresponding to combinations of name strings of the name map 700a and associated value strings of the value map 702a. For example, string "host" 710 may have value "ia56789." The corresponding long value in the dimension map 720 for this specific name-value pair (e.g., "host: ia56789") may be "134534 . . . 623" with an offset of 64437. It is understood that all the offset values indicate locations in memory of the data (e.g., how far the data is offset from a specific location in memory). As a result, the data associated with the name-value pairs may be quickly looked up through the dimension map 720. Similarly, the name table 700b and the value table 702b may be utilized to lookup string values from offset values.

According to embodiments, an MTS index may be split into three indices: one for dimension or property names, one for dimension or property values, and one for metric names. In addition, the dimension map 720 may map long values to offsets (e.g., stores nameOffsetValueOffset->dimRecord-Offset for each dimension). For example, the dimension map 720 may correlate the host 710 having the value 712 with a long value 722.

Similarly, on receiving an MTS object, each dimension may be converted to an integer (e.g., dimRecordOffset) by looking up the name in the name map 700, looking up the value in the value map 702, and combining those into long values (e.g., long value 722) used to get or add an entry in the dimension map 720.

According to embodiments, the dimension map 720 may include a combination of the name-value pair based on the offsets of the name-value pair in the in-memory tables. For example, integer values of each name-value pair may be combined into a long value, which may also be utilized to look up each name-value pair.

Figure 8:
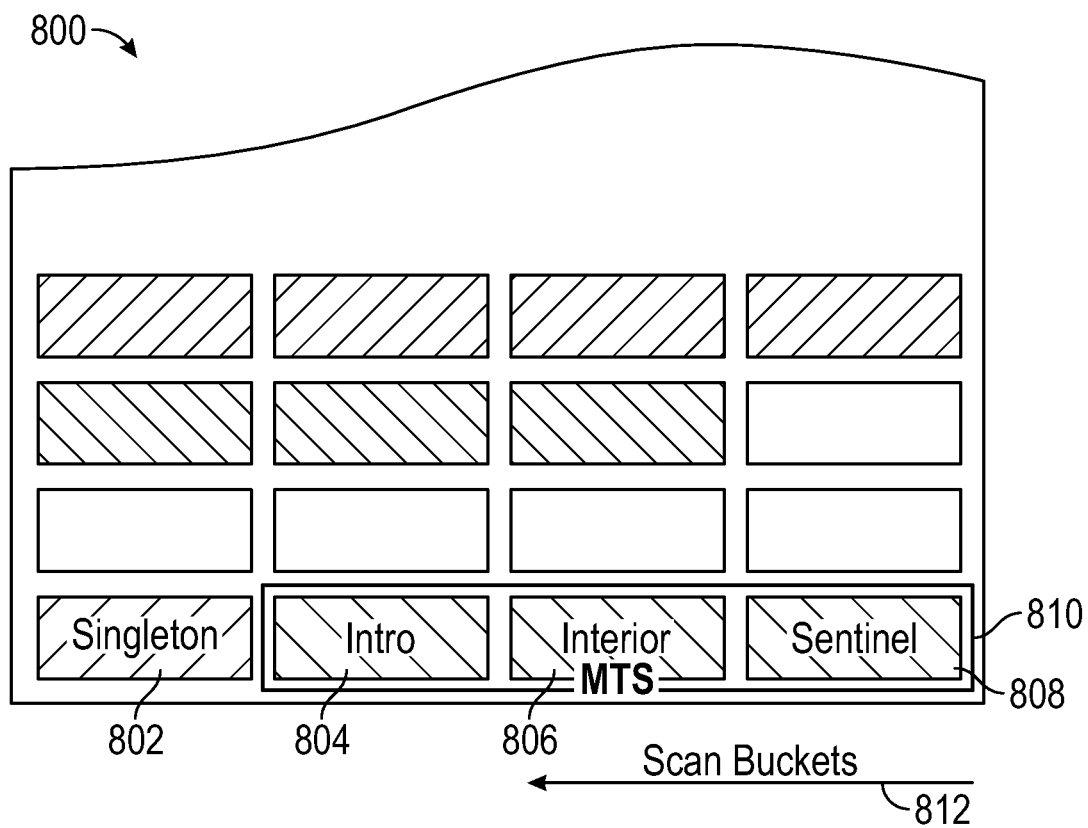
FIG. 8 illustrates an example MTS table structure, according to an embodiment of the present disclosure.

FIG. 8 illustrates an example MTS table structure 800, according to an embodiment of the present disclosure. The MTS table structure 800 may include in-memory storage, such as the MTS indexes of FIG. 7, and MTS tables 800. The MTS table 800 may include MTS records 810. For example, each MTS record 810 may include at least one bucket and/or a chain of buckets (e.g., 802, 804, 806, and 808). According to embodiments, the chain of buckets may include at least one bucket of fixed width (e.g., 32 bytes). In this way, the MTS table structure 800 may be configured to fit into cache lines for improved efficiency.

According to embodiments, the MTS record 810 may include at least one of four types of buckets: singleton 802, intro 804, interior 806, and sentinel 808. The singleton 802 may include a single bucket that does not have any dimensions. The intro 804 may be the first bucket in a chain of buckets representing an MTS record 810. The interior 806 may include a middle bucket in the chain of buckets of the MTS record 810. For example, the interior may include a single bucket or a chain of buckets in between the intro 804 and the sentinel 808. The sentinel 808 may be a last bucket in the chain of buckets of the MTS record 810.

According to embodiments, the data may be scanned backwards 812 from the most recent entries (e.g., the sentinel 808) to the oldest (e.g., the intro 804). For example, as soon as a first N number of MTS records 810 is found, the scan stops (e.g., the default number of MTS records 810 may be 10,000).

Figure 9:
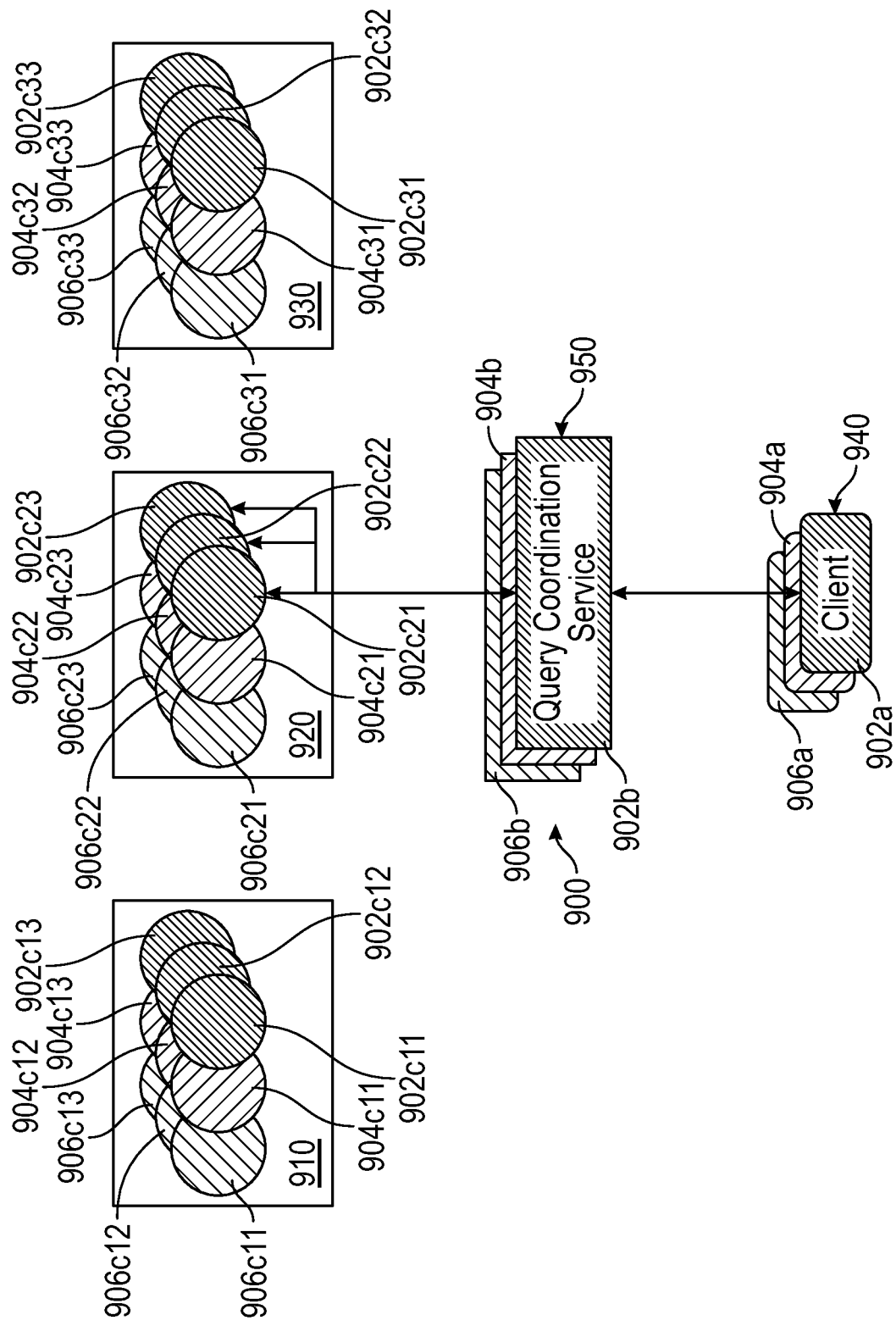
FIG. 9 illustrates a distributed architecture, according to an embodiment of the present disclosure.

FIG. 9 illustrates a distributed architecture 900 for storing replicated data across clusters, according to an embodiment of the present disclosure. The distributed architecture 900 may include a client 940 coupled to a query coordination service 950. The query coordination service 950 may be coupled to a first cluster 910, a second cluster 920, and a third cluster 930.

According to embodiments, MTS objects and dimension data may be replicated multiple times (e.g., at least three times or more). For example, the client 940 may store a first replica 902a, a second replica 904a, and a third replica 906a. The replica may include MTS object and dimension data in in-memory tables as described above. The query coordination service 950 may also store a first replica 902b, a second replica 904b, and a third replica 906b. For example, the first replica 902a of the client 940 may be the same as the first replica 902b of the query coordination service 950. The second replica 904a of the client 940 may be the same as the second replica 904b of the query coordination service 950. The third replica 906a of the client 940 may be the same as the third replica 906b of the query coordination service 950.

According to embodiments, each of the first replica 902, the second replica 904, and a third replica 906 may be sharded across each of the first cluster 910, the second cluster 920, and the third cluster 930. For example, nodes 902c11, 902c12, and 902c13 may include information of the first replica 902 in the first cluster. Nodes 902c21, 902c22, and 902c23 may include information of the first replica 902 in the second cluster 920. Nodes 902*c*31, 902*c*32, and 902*c*33 may include information of the first replica 902 in the third cluster 930.

Similarly, nodes 904*c*11, 904*c*12, and 904*c*13 may include information of the second replica 904 in the first cluster 910. Nodes 904*c*21, 904*c*22, and 904*c*23 may include information of the second replica 904 in the second cluster 920. Nodes 904*c*31, 904*c*32, and 904*c*33 may include information of the second replica 904 in the third cluster 930. Additionally, nodes 906*c*11, 906*c*12, and 906*c*13 may include information of the third replica 906 in the first cluster 910. Nodes 906*c*21, 906*c*22, and 906*c*23 may include information of the third replica 906 in the second cluster 920. Nodes 906*c*31, 906*c*32, and 906*c*33 may include information of the third replica 906 in the third cluster 930.

In this way, an entire corpus of information may be replicated and distributed among multiple nodes of multiple clusters to improve scalability, fault tolerance, and availability. For example, if more capacity is desired, the data may be distributed in smaller chunks that are distributed across the clusters. Furthermore, the clusters may be isolated from each other so that the clusters do not affect each other. In this way, each cluster may have its own dedicated infrastructure, which further improves on efficiency and scalability.

According to embodiments, when the query coordination service 950 receives a query from the client 940, the query coordination service 950 may query each node in each cluster. This is because the corpus of data is split among the various nodes in the various clusters. The query coordination service 950 then returns results of the query to the client 940. According to embodiments, the query coordination service 950 may also be configured to prioritize communication with local replicas, which saves on cross-region traffic and provides improved latency over communicating with non-local replicas.

Figure 10A:
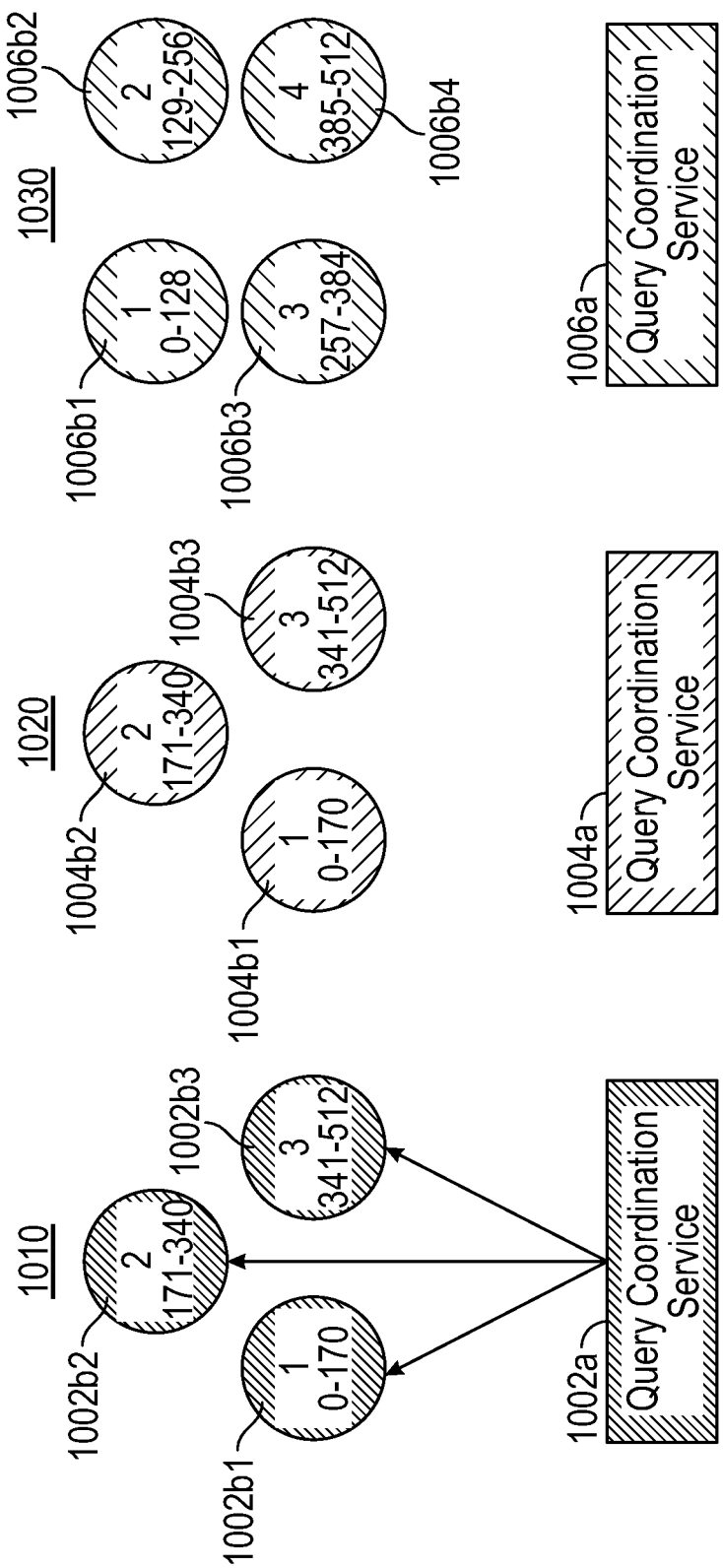
FIG. 10A illustrates querying across multiple nodes, according to an embodiment of the present disclosure.

FIG. 10A illustrates querying across multiple nodes, according to an embodiment of the present disclosure. For example, a first replica 1002*a* of data may be replicated across nodes 1002*b*1, 1002*b*2, and 1002*b*3. In an implementation, the data may include 512 logical partitions that may be sharded across three nodes in a first cluster 1010. For example, node 1002*b*1 may store partitions 0-170, node 1002*b*2 may store partitions 171-340, and node 1002*b*3 may store partitions 341-512.

Similarly, a second replica 1004*a* of data may be replicated across nodes 1004*b*1, 1004*b*2, and 1004*b*3. For example, node 1004*b*1 may store partitions 0-170, node 1004*b*2 may store partitions 171-340, and node 1004*b*3 may store partitions 341-512. Additionally, a third replica 1006*a* of data may be replicated across nodes 1006*b*1, 1006*b*2, 1006*b*3, and 1006*b*4. For example, node 1006*b*1 may store partitions 0-128, node 1006*b*2 may store partitions 129-256, node 1006*b*3 may store partitions 257-384, and node 1006*b*4 may store partitions 385-512. It is understood that each cluster may be partitioned in different ways based on available resources and desired size of partitions.

As illustrated, a query coordination service associated with the first replica 1002*a* may be configured to query each of the nodes 1002*b*1, 1002*b*2, and 1002*b*3 for data. It is understood that any query coordination service associated with any of the replica data may query any node of any cluster.

According to embodiments, when data is added to each cluster, the cluster automatically redistributes all the data throughout the clusters based on the partitioning of the nodes so that the added data is absorbed by the clusters without any manual intervention.

Figure 10B:
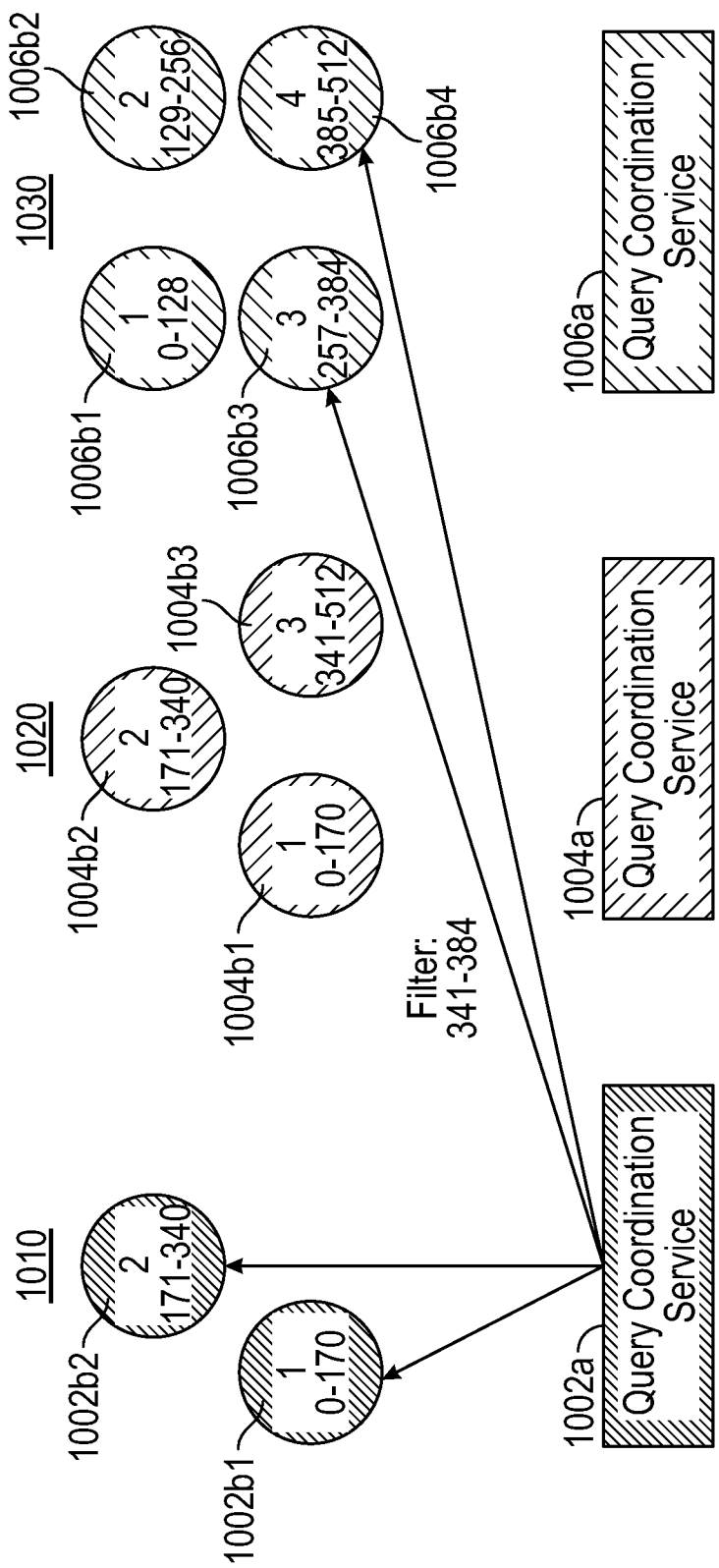
FIG. 10B illustrates querying across multiple nodes when a nodes is unavailable, according to an embodiment of the present disclosure.

FIG. 10B illustrates querying across multiple nodes when a node is unavailable, according to an embodiment of the present disclosure. For example, node 1002*b*3 may be unavailable (e.g., under maintenance). Instead of querying node 1002*b*3 for the data, the query coordination service may query nodes 1006*b*3 and 1006*b*4 of the third cluster 1030. This is because partitions 341-512 of the first replica 1002 are unavailable in node 1002*b*3 of the first cluster 1010. Accordingly, the third cluster 1030 includes partitions 341-512 of the third replica 1006 across nodes 1006*b*3 (e.g., partitions 257-384) and 1006*b*4 (e.g., partitions 385-512), and so both nodes 1006*b*3 and 1006*b*4 are queried.

According to embodiments, each of the query coordination services associated with each of the first replica 1002, the second replica 1004 and the third replica 1006 may query any of the nodes of any of the clusters. In this way, the system may adjust for changes in the availability of nodes without interrupting services.

Process for Bifurcated Storage of Metadata

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 11:
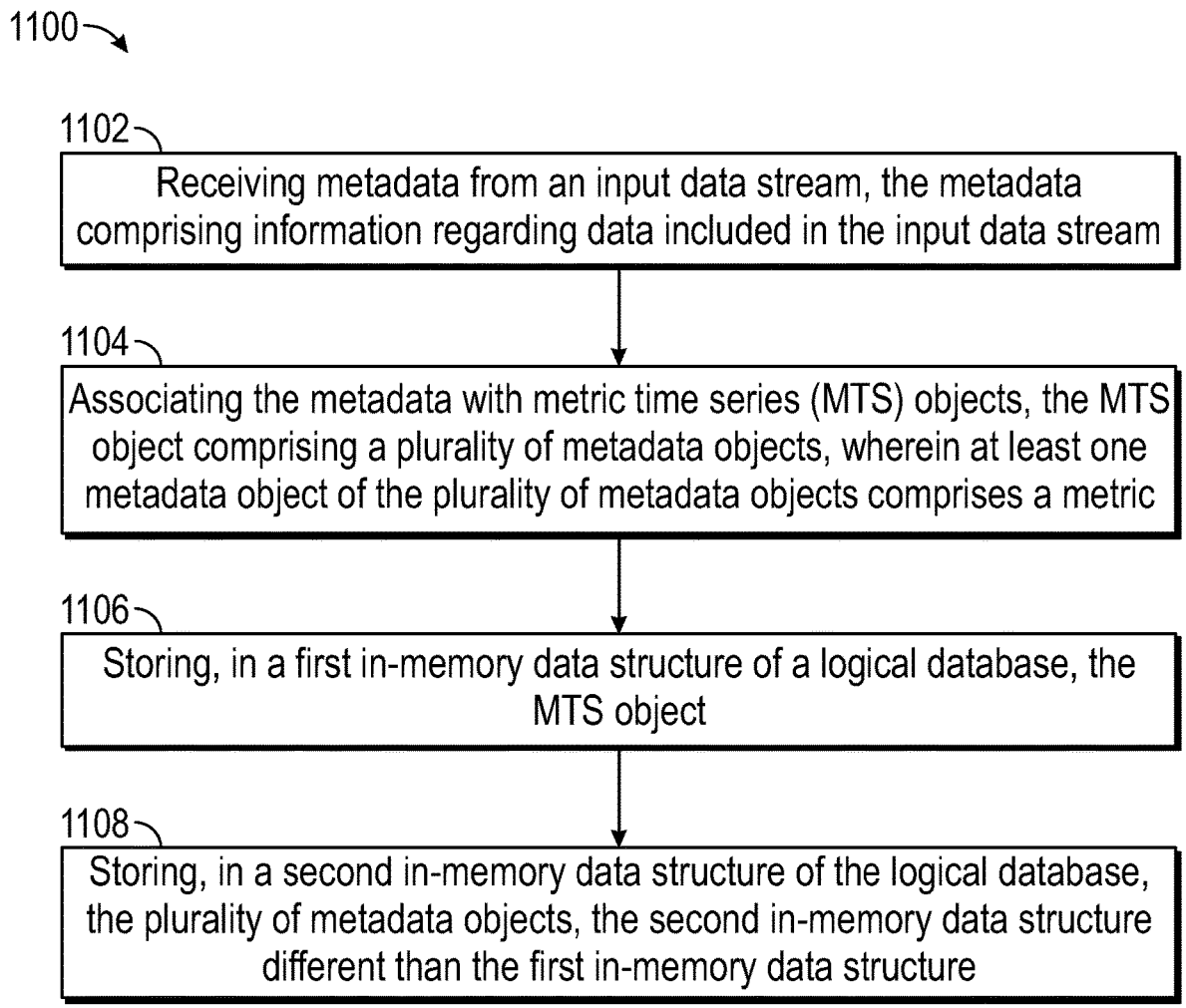
FIG. 11 is a flow diagram illustrative of an embodiment of a process for bifurcating storage of metadata, according to embodiments of the present disclosure.

FIG. 11 is a flow diagram illustrative of an embodiment of a process 2400 for bifurcating storage of metadata, according to embodiments of the disclosure. For explanatory purposes, the steps of the example process 1100 are described herein as occurring in serial, or linearly. However, multiple instances of the example process 1100 may occur in parallel, and/or the various steps may be performed concurrently and/or in a different order or sequence than is described herein.

At step 1102, metadata is received from an input data stream, the metadata comprising information regarding data included in the input data stream. At step 1104, the metadata is associated with a metric time series (MTS) object, the MTS object comprising a plurality of metadata objects, wherein at least one metadata object of the plurality of metadata objects comprises a metric. At step 1106, the MTS object is stored in a first in-memory data structure of a logical database. At step 1108, the plurality of metadata objects are stored in a second in-memory data structure of the logical database, the second in-memory data structure different than the first in-memory data structure.

According to embodiments, the process 1100 further includes maintaining an entry in a third in-memory data structure, the entry associating the MTS object with the plurality of metadata objects.

According to embodiments, associating the metadata with the MTS object further comprises extracting names and values from the metadata, and linking the names with the values as name-value pairs, each metadata object comprising a name-value pair.

According to embodiments, the process 1100 further includes generating an MTS record based on the MTS object, the MTS record comprising at least one bucket. According to embodiments, the process 1100 further includes generating an MTS record based on the MTS object, the MTS record comprising at least one bucket, wherein the at least one bucket comprises at least one memory element of a fixed width in an in-memory data structure, the at least one bucket further comprising at least one of: a singleton having a single MTS record, a first bucket in a chain of buckets, a middle bucket in a chain of buckets, and/or a last bucket in a chain of buckets.

According to embodiments, the process 1100 further includes generating an MTS record based on the MTS object, the MTS record comprising at least one bucket, and querying the MTS record based on the first in-memory data structure and the second in-memory data structure.

According to embodiments, the process 1100 further includes generating an MTS record based on the MTS object, the MTS record comprising at least one bucket, and querying the MTS record based on the first in-memory data structure and the second in-memory data structure. The querying may further include scanning data of the MTS record backwards from a most recent entry to an oldest entry.

According to embodiments, the process 1100 further includes storing names of the metadata objects in a third in-memory data structure of the logical database, and storing values of the metadata objects in a fourth in-memory data structure of the logical database, the fourth in-memory data structure different than the third in-memory data structure.

According to embodiments, the process 1100 further includes jointly querying the plurality of metadata objects and the MTS object based on the first in-memory data structure and the second in-memory data structure. According to embodiments, the process 1100 further includes updating a metadata object of the plurality of metadata objects without updating the MTS object.

According to embodiments, the process 1100 further includes receiving a query. The process 1100 further includes, in response to receiving the query, retrieving, from the first in-memory data structure, the MTS object and retrieving, from the second in-memory data structure, at least one metadata object associated with the MTS object. The process 1100 further includes outputting results of the query to a user interface, the results comprising the MTS object and the at least one metadata object associated with the MTS object.

According to embodiments, executing a query may include a flexible workflow that depends on a nature of the query. For example, the query may include a query planning/execution process, which is flexible.

What is claimed is:

1. A computer-implemented method for storing metadata in a distributed system, the method comprising:
   receiving, from a source independent of a data source of an input data stream, metadata comprising information regarding data included in the input data stream, wherein introduction of the metadata does not increase an amount of data in the input data stream;
   associating the metadata with a metric time series (MTS) object, the MTS object comprising a plurality of metadata objects, wherein at least one metadata object of the plurality of metadata objects comprises a metric;
   storing, in a first in-memory data structure of a logical database, the MTS object;
   storing, in a second in-memory data structure of the logical database, the plurality of metadata objects, the second in-memory data structure different than the first in-memory data structure;
   replicating the MTS object to generate at least three replicas of the MTS object, the at least three replicas distributed across multiple clusters;
   jointly querying the plurality of metadata objects and the MTS object based on the first in-memory data structure and the second in-memory data structure, wherein local replicas of the at least three replicas are prioritized over cross-region replicas;
   associating, based on the querying, dimensions with the MTS object according to the first in-memory data structure and the second in-memory data structure, wherein the first in-memory data structure and the second in-memory data structure include information correlating the dimensions with MTS objects, each dimension comprising a subset of the plurality of metadata objects;
   storing, in a third in-memory data structure, a set of queries associated with the MTS object, wherein updates to the MTS object relating to one or more queries in the set of queries are automatically output to a user interface; and
   partitioning the at least three replicas into partitions shared across at least three nodes in a cluster of the multiple clusters, wherein each cluster of the multiple clusters are isolated from each other and the partitions of the at least three replicas across nodes are different in each of the clusters.

2. The computer-implemented method of claim 1, further comprising maintaining an entry in a fourth in-memory data structure, the entry associating the MTS object with the plurality of metadata objects.

3. The computer-implemented method of claim 1, wherein associating the metadata with the MTS object further comprises:
   extracting names and values from the metadata; and
   linking the names with the values as name-value pairs, each metadata object comprising a name-value pair.

4. The computer-implemented method of claim 1, further comprising:
   generating an MTS record based on the MTS object, the MTS record comprising at least one bucket.

5. The computer-implemented method of claim 1, further comprising generating an MTS record based on the MTS object, the MTS record comprising at least one bucket,
   wherein the at least one bucket comprises at least one memory element of a fixed width in an in-memory data structure, the at least one bucket further comprising at least one of: a singleton having a single MTS record, a first bucket in a chain of buckets, a middle bucket in a chain of buckets, or a last bucket in a chain of buckets.

6. The computer-implemented method of claim 1, further comprising:
   generating an MTS record based on the MTS object, the MTS record comprising at least one bucket; and
   querying the MTS record based on the first in-memory data structure and the second in-memory data structure.

7. The computer-implemented method of claim 1, further comprising:
   generating an MTS record based on the MTS object, the MTS record comprising at least one bucket; and
   querying the MTS record based on the first in-memory data structure and the second in-memory data structure, the querying further comprising:
     scanning data of the MTS record backwards from a most recent entry to an oldest entry.

8. The computer-implemented method of claim 1, further comprising: storing names of the metadata objects in a fourth in-memory data structure of the logical database; and
   storing values of the metadata objects in a fifth in-memory data structure of the logical database, the fifth in-memory data structure different than the third in-memory data structure.

9. The computer-implemented method of claim 1, further comprising: receiving a query;
in response to receiving the query, retrieving, from the first in-memory data structure, the MTS object and retrieving, from the second in-memory data structure, at least one metadata object associated with the MTS object; and
outputting results of the query to the user interface, the results comprising the MTS object and the at least one metadata object associated with the MTS object.

10. The computer-implemented method of claim 1, further comprising: updating a metadata object of the plurality of metadata objects without updating the MTS object.

11. A system for storing metadata in a distributed system, the system comprising:
at least one memory having instructions stored thereon; and
at least one processor configured to execute the instructions, wherein the at least one processor is configured to:
receive, from a source independent of a data source of an input data stream, metadata comprising information regarding data included in the input data stream, wherein introduction of the metadata does not increase an amount of data in the input data stream;
associate the metadata with a metric time series (MTS) object, the MTS object comprising a plurality of metadata objects, wherein at least one metadata object of the plurality of metadata objects comprises a metric;
store, in a first in-memory data structure of a logical database, the MTS object;
store, in a second in-memory data structure of the logical database, the plurality of metadata objects, the second in-memory data structure different than the first in-memory data structure;
replicate the MTS object to generate at least three replicas of the MTS object, the at least three replicas distributed across multiple clusters;
jointly query the plurality of metadata objects and the MTS object based on the first in-memory data structure and the second in-memory data structure, wherein local replicas of the at least three replicas are prioritized over cross-region replicas;
associate, based on the query, dimensions with the MTS object according to the first in-memory data structure and the second in-memory data structure, wherein the first in-memory data structure and the second in-memory data structure include information correlating the dimensions with MTS objects, each dimension comprising a subset of the plurality of metadata objects;
store, in a third in-memory data structure, a set of queries associated with the MTS object, wherein updates to the MTS object relating to one or more queries in the set of queries are automatically output to a user interface; and
partition the at least three replicas into partitions shared across at least three nodes in a cluster of the multiple clusters, wherein each cluster of the multiple clusters are isolated from each other and the partitions of the at least three replicas across nodes are different in each of the clusters.

12. The system of claim 11, wherein the processor is further configured to maintain an entry in a fourth in-memory data structure, the entry associating the MTS object with the plurality of metadata objects.

13. The system of claim 11, wherein the processor is further configured to: extract names and values from the metadata; and
link the names with the values as name-value pairs, each metadata object comprising a name-value pair.

14. The system of claim 11, wherein the processor is further configured to: generate an MTS record based on the MTS object, the MTS record comprising at least one bucket.

15. The system of claim 11, wherein the processor is further configured to generate an MTS record based on the MTS object, the MTS record comprising at least one bucket, wherein the at least one bucket comprises at least one memory element of a fixed width in an in-memory data structure, the at least one bucket further comprising at least one of: a singleton having a single MTS record, a first bucket in a chain of buckets, a middle bucket in a chain of buckets, or a last bucket in a chain of buckets.

16. The system of claim 11, wherein the processor is further configured to: generate an MTS record based on the MTS object, the MTS record comprising at least one bucket; and
query the MTS record based on the first in-memory data structure and the second in-memory data structure.

17. The system of claim 11, wherein the processor is further configured to: generate an MTS record based on the MTS object, the MTS record comprising at least one bucket; and
query the MTS record based on the first in-memory data structure and the second in-memory data structure, the querying further comprising:
scanning data of the MTS record backwards from a most recent entry to an oldest entry.

18. The system of claim 11, wherein the processor is further configured to: store names of the metadata objects in a fourth in-memory data structure of the logical database; and
store values of the metadata objects in a fifth in-memory data structure of the logical database, the fifth in-memory data structure different than the third in-memory data structure.

19. The system of claim 11, wherein the processor is further configured to: receive a query;
in response to receiving the query, retrieve, from the first in-memory data structure, an MTS object and retrieve, from the second in-memory data structure, a metadata object associated with the MTS object; and
output results of the query to the user interface, the results comprising the MTS object and the at least one metadata object associated with the MTS object.

20. The system of claim 11, wherein the processor is further configured to update a metadata object of the plurality of metadata objects without updating the MTS object.

21. A non-transitory computer-readable storage medium comprising instructions stored thereon, which when executed by one or more processors, cause the one or more processors to perform operations for storing metadata in a distributed system, the operations comprising:
receiving, from a source independent of a data source of an input data stream, metadata comprising information regarding data included in the input data stream, wherein introduction of the metadata does not increase an amount of data in the input data stream;
associating the metadata with a metric time series (MTS) object, the MTS object comprising a plurality of metadata objects, wherein at least one metadata object of the plurality of metadata objects comprises a metric;

storing, in a first in-memory data structure of a logical database, the MTS object;

storing, in a second in-memory data structure of the logical database, the plurality of metadata objects, the second in-memory data structure different than the first in-memory data structure;

replicating the MTS object to generate at least three replicas of the MTS object, the at least three replicas distributed across multiple clusters;

jointly querying the plurality of metadata objects and the MTS object based on the first in-memory data structure and the second in-memory data structure, wherein local replicas of the at least three replicas are prioritized over cross-region replicas;

associating, based on the querying, dimensions with the MTS object according to the first in-memory data structure and the second in-memory data structure, wherein the first in-memory data structure and the second in-memory data structure include information correlating the dimensions with MTS objects, each dimension comprising a subset of the plurality of metadata objects;

storing, in a third in-memory data structure, a set of queries associated with the MTS object, wherein updates to the MTS object relating to one or more queries in the set of queries are automatically output to a user interface; and partitioning the at least three replicas into partitions shared across at least three nodes in a cluster of the multiple clusters, wherein each cluster of the multiple clusters are isolated from each other and the partitions of the at least three replicas across nodes are different in each of the clusters.

22. The non-transitory computer-readable storage medium of claim 21, comprising further instructions which, when executed by the one or more processors, cause the one or more processors to perform operations comprising:
maintaining an entry in a fourth in-memory data structure, the entry associating the MTS object with the plurality of metadata objects.

23. The non-transitory computer-readable storage medium of claim 21, comprising further instructions which, when executed by the one or more processors, cause the one or more processors to perform operations comprising:
extracting names and values from the metadata; and
linking the names with the values as name-value pairs, each metadata object comprising a name-value pair.

24. The non-transitory computer-readable storage medium of claim 21, comprising further instructions which, when executed by the one or more processors, cause the one or more processors to perform operations comprising:
generating an MTS record based on the MTS object, the MTS record comprising at least one bucket.

25. The non-transitory computer-readable storage medium of claim 21, comprising further instructions which, when executed by the one or more processors, cause the one or more processors to perform operations comprising:
generating an MTS record based on the MTS object, the MTS record comprising at least one bucket,
wherein the at least one bucket comprises at least one memory element of a fixed width in an in-memory data structure, the at least one bucket further comprising at least one of: a singleton having a single MTS record, a first bucket in a chain of buckets, a middle bucket in a chain of buckets, or a last bucket in a chain of buckets.

26. The non-transitory computer-readable storage medium of claim 21, comprising further instructions which, when executed by the one or more processors, cause the one or more processors to perform operations comprising:
storing names of the metadata objects in a fourth in-memory data structure of the logical database; and
storing values of the metadata objects in a fifth in-memory data structure of the logical database, the fifth in-memory data structure different than the third in-memory data structure.

27. The non-transitory computer-readable storage medium of claim 21, comprising further instructions which, when executed by the one or more processors, cause the one or more processors to perform operations comprising:
receiving a query;
in response to receiving the query, retrieving, from the first in-memory data structure, the MTS object and retrieving, from the second in-memory data structure, at least one metadata object associated with the MTS object; and
outputting results of the query to the user interface, the results comprising the MTS object and the at least one metadata object associated with the MTS object.

28. The non-transitory computer-readable storage medium of claim 21, comprising further instructions which, when executed by the one or more processors, cause the one or more processors to perform operations comprising:
updating a metadata object of the plurality of metadata objects without updating the MTS object.

\* \* \* \* \*